April 14, 1925.
F. A. FAHRENWALD
ELECTRIC HEATING DEVICE
Filed April 6, 1922
1,533,175
2 Sheets-Sheet 1
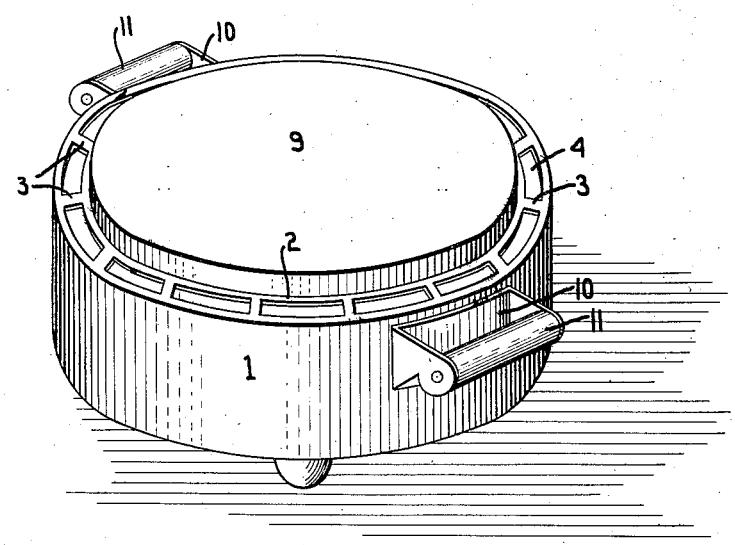
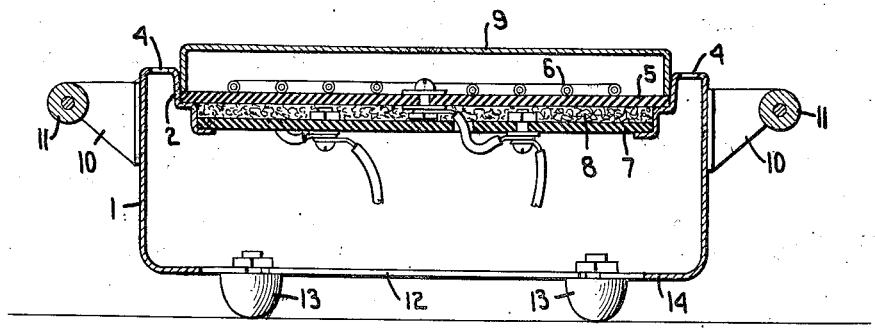
Frank A. Fahrenwald
INVENTOR.
BY
ATTORNEY.

April 14, 1925.

F. A. FAHRENWALD

ELECTRIC HEATING DEVICE

Filed April 6, 1922

1,533,175

2 Sheets-Sheet 2

Frank A. Fahrenwald
INVENTOR.

BY

ATTORNEY.

Patented Apr. 14, 1925.

1,533,175

UNITED STATES PATENT OFFICE.

FRANK A. FAHRENWALD, OF CLEVELAND HEIGHTS, OHIO.

ELECTRIC HEATING DEVICE.

Application filed April 6, 1922. Serial No. 550,150.

*To all whom it may concern:*

Be it known that I, FRANK A. FAHRENWALD, a citizen of the United States, residing at Cleveland Heights, in the county of Cuyahoga and State of Ohio, have invented a certain new and useful Improvement in Electric Heating Devices, of which the following is a full, clear, and exact description, reference being had to the accompanying drawings.

This invention relates to electric heating appliances and especially to that class of appliances frequently called "hot plates" or "electric stoves" adapted for heating liquids or cooking foods and employed on a dining table, buffet, or any other chance location. It is an objection occasionally noted in these devices that the sides and bottoms of the same become so highly heated as not only to be untouchable, but also to burn linen and injure woodwork upon which the same are supported. The objects of the present invention are the provision of a device of this character which shall not become hot upon the bottom or sides which can be used even on highly polished furniture without injuring the finish; which can be handled with impunity during operation; and which shall convert into useful heat a larger proportion of the electric current applied thereto; while further objects and advantages of the invention will become apparent as the description proceeds.

Figure 3:
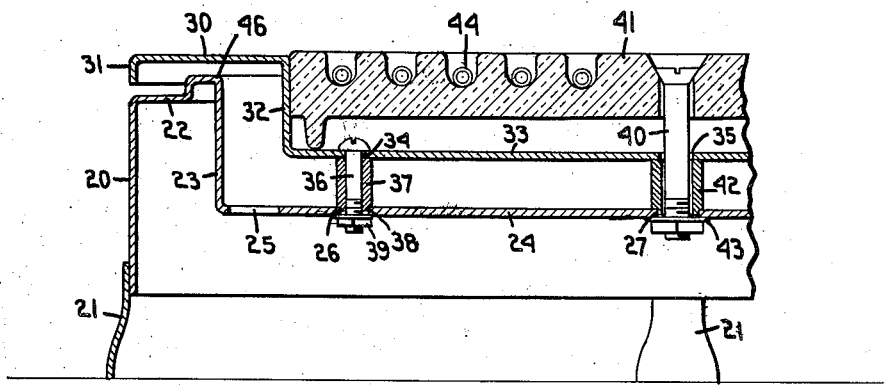
Figure 4:
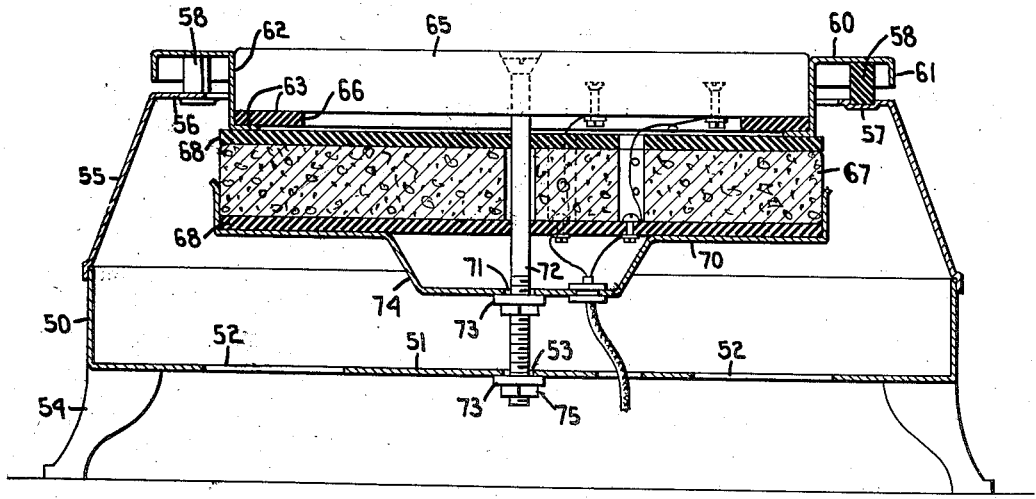

In the drawings accompanying and forming a part of this application I have shown certain illustrative embodiments of my inventive idea. Fig. 1 is a perspective view of a cheap and simple electric stove embodying my improvements; Fig. 2 is a sectional view of the device shown in Fig. 1; and Figs. 3 and 4 are modified forms of stoves embodying my improvements in a more complete degree and a more elaborate form.

The essence of my invention consists in the combination of heat insulating devices combined with convection provisions for dissipating such conducted or radiant heat as may leak away from the active element. In Figs. 1 and 2, 1 represents a thin, sheet-metal shell having an annular supporting member 2, integrally connected thereto by means of narrow, slender webs 3 constituting supporting brackets of small thermal conductivity and defining comparatively large convection openings 4. Carried in the supporting member 2 is a heating element of any suitable or desired nature, here shown as comprising an insulating plate 5 carrying on its upper face the resistance coil 6 and overlying a lower insulating plate 7 from which it is separated by a loosely-packed, heat-insulating material 8. 9 designates a flat disk of conducting metal overlying the resistance element as desired for some purposes, and 10—10 represent brackets carried by the shell and having handles 11 of wood or other cheap material.

The bottom of the shell is entirely or largely open as shown at 12 and is supported by suitable legs 13 so as to permit a free inrush of air. I have shown the lower end of the shell wall as turned inwardly at 14 to provide a ledge inside which the flexible cord can be coiled when not in use.

In use the member 2 becomes highly heated but the small size of the brackets 3 limits their heat conductivity to such an extent that the convection currents through the opening 4 can carry away the heat from the shell 1 sufficiently rapidly to prevent injury to any article on which the device stands.

Referring now to Fig. 3, 20 represents a shell supported on suitable legs 21 and having at its upper end an inwardly projecting flange 22 by which it is integrally connected to the inner depending wall 23 whose bottom merges into a circular bottom 24 formed with air circulation openings 25 and bolt holes 26—27. Such a member can easily be drawn from a single piece of sheet metal as will be well understood. This member constitutes the bottom of the stove, and the top member consists of a circular sheet metal member having a flat annular portion 30 terminating in depending outer and inner cylindrical walls 31—32 respectively, the latter having at its lower end a flat bottom 33 formed with bolt holes 34 and 35. The bolt holes 34 register with the bolt holes 26 for the reception of the assembling bolts 36 each being surrounded by the insulating sleeve 37 and having heat insulating washers 38 interposed between the nuts 39 and the bottom 24. The hole 35 registers with the hole 27 for the reception of the center bolt 40 which holds the heating element 41 in place, a similar insulation sleeve 42 and washer 43 being employed. The heating element may be of any suitable or desired type, that here shown consisting of a porcelain plate having resistance wires 44 mounted in suitable grooves formed therein.

It will be seen that there is no metallic connection between the upper and lower stove members. The portion 30 overlies the portion 22 but is spaced therefrom at every point to provide an uninterrupted air convection slit. The annular hump 46 formed in the portion 23 is solely for appearance, as also is the down-turned flange 31 and the fact that it registers with the exterior of the shell 20.

A more elaborate stove is illustrated in Fig. 4, wherein 50 represents a bottom portion having a bottom web 51 formed with air circulation apertures 52 and a bolt hole 53 and also provided with legs 54. Mounted upon this is a detachable section 55 having at its upper end an inturned flange 56 formed at spaced points with suitable seats 57 in which are mounted blocks 58 of heat insulating material such as slate, soap-stone, porcelain, lava or other suitable substances. Resting on these blocks is the flat portion 60 of a supporting ring, the outer edge of which is preferably turned downwardly to form a stiffening flange 61 and the inner edge of which merges with a cylindrical wall 62 terminating in a lip 63. Located in this ring is a heating element 65 which may be of any suitable or desired construction. Between it and the lip 63 I have shown an asbestos ring 66 but this only for the purpose of providing space for the binding screw which can be otherwise secured. Beneath the heated element I have shown a heat insulating block 67 enclosed between asbestos sheets 68, 68. The block 67 is preferably made of infusorial earth, either with or without an admixture of asbestos magnesia, etc. though I do not limit myself to this composition. In order to support and reinforce these members which are somewhat fragile I have shown a cup shaped member 70 whose bottom is formed with a center-bolt-hole 71 through which passes the center-bolt 72. This one bolt accordingly holds the entire stove together, being insulated from the cup 70 and the bottom plate 51 by insulating washers 73. The bottom of the cup 70 is preferably dished as shown at 74 both for the purpose of providing space for the wires and of providing a free circular portion to afford resiliency. Likewise the outside nut 75 is screwed down until the entire bottom is dished, thereby holding the members tightly together.

Such a stove can be operated for many days upon an unprotected piece of furniture after which time it is impossible by the sense of touch to determine where the stove sat. I find, however, that it is nearly as important to insulate thermally as electrically, and that even in case the device be thoroughly insulated thermally, yet convection provisions are important to carry away the accumulation of heat by internal radiation. I find also that it is desirable to have these air convection openings so located relatively to the heating unit that the external air currents generated thereby shall have an aspirating effect upon the air inside the shell; so that the air sweeping past these openings may change the air inside the shell more rapidly than if the circulation were produced solely by the heat inside the same. I find also that the beneficial heating effect can be obtained noticeably more quickly with a device of this nature than in a stove where loss of heat is not prevented. I do not limit myself, however, to the employment of these improvements in connection with a mere hot plate or stove since it is obvious that the same conditions exist in case the article to be heated be permanently attached to the heating element, and I do not restrict myself to any of the designs, shapes, arrangements, or mechanical structures herein illustrated or claimed except as specifically recited in my claims.

Having thus described my invention what I claim is:

1. In an electric device, in combination, an electric resistance unit, an external shell disposed about said unit, supporting devices of small thermal conductivity supporting said unit from said shell, and convection provisions whereby the air currents generated by the unit may carry away all stray heat generated or conveyed inside the shell.

2. In an electric heating device, in combination, an upright shell, and an electric resistance unit located inside said shell and separated therefrom by an air space with said shell disposed about said unit, there being air circulation openings at the top and bottom of such space.

3. In an electric heater, in combination, a shell, a heating unit inside the same and spaced therefrom with said shell disposed about said unit, and supporting brackets of small thermal conductivity supporting said unit from the shell walls and defining air fluxes, the bottom of said shell having an air admission opening.

4. In an electric heater, a shell having an open top and bottom, a heating unit supported inside said shell and spaced from the walls thereof with said shell disposed about said unit, to form an annular convection flue, the supporting means possessing a small thermal conductivity, and the upper end of said flue located in a position to be swept by the external convection currents set up by the heating unit.

5. In an electric heater, a unit, a sheet metal shell disposed about said unit supporting said unit, the walls of said shell being spaced from said unit to define an air passage but connected thereto by brackets of small thermal conductivity.

6. In an electric heater, a frame comprising a wall portion and a unit-support, said support and wall portion being connected by brackets of small thermal conductivity and spaced apart to define air-circulation passages, in combination with a heating unit mounted in said unit support out of heat-traversing relation with said wall portion.

7. In an electric heater, a frame comprising a sheet metal wall portion and a unit support integral therewith, there being air circulation openings formed between said wall portion and unit support and the metal between said openings being so restricted in volume as to possess a comparatively limited thermal conductivity, in combination with a unit secured to said unit support out of heat transferring relation with said wall portion.

8. In an electric heater a shell having air circulating openings at upper and lower points thereof, and a heater unit suspended inside said shell and spaced from the walls thereof with said shell disposed about said unit, the suspending means being of small thermal conductivity.

9. In an electric heater, a shell having a cylindrical wall and inturned flanges at top and bottom thereof, a heating unit secured to the top flange and a flexible conducting cord secured to said unit inside said shell, the space inside the shell beneath the unit adapted to have the cord coiled therein.

10. In an electric heater, in combination, a shell having a flange at its upper end, a ring spaced from said flange to define an air-convection passage, an electric resistance element carried by said ring with said shell disposed about said unit, heat insulating material located beneath said element and spaced from said shell, and supporting devices of small thermal conductivity connecting said shell and ring, said shell having air outlet openings at the bottom.

11. In an electric heater, in combination, a resistance heating element, a metallic ring surrounding it, heat insulating material beneath it, a metal shell surrounding and spaced from both said ring, said element, and said insulating material, said shell having convection openings, and supporting devices of sufficiently small heat conductivity connecting said ring and shell so that the convection currents produced in said shell may remove heat therefrom as rapidly as it is conducted thereto.

12. In an electric heating device the combination with a heating element and heat insulating substance beneath and around it, of a metal shell surrounding and spaced from said element and substance, said shell having air inlet openings at its bottom and air outlet openings at the side of said element.

13. A heating device comprising a heating unit, a frame disposed about said unit and spaced therefrom, and low heat conductivity means supporting said unit from said frame without appreciably obstructing the space between said unit and said frame.

14. A heating device comprising a heating unit, a frame disposed about said unit spaced therefrom and open to permit free flow of air through the space between said unit and said frame, and low heat conductivity means supporting said unit from said frame without appreciably interfering with such flow of air.

15. A heating device comprising a heating unit, a frame disposed about said unit spaced laterally therefrom and open to permit free upward flow of air through the space between said unit and said frame, and low heat conductivity means supporting said unit from said frame without appreciably interfering with such flow of air.

In testimony whereof, I hereunto affix my signature.

FRANK A. FAHRENWALD.